United States Patent [19]

Rogier

[11] Patent Number: 4,576,256
[45] Date of Patent: Mar. 18, 1986

[54] WHEEL HUB WITH BUILT-IN BRAKE

[75] Inventor: Léonce Rogier, Saint Denis, France

[73] Assignee: SO.M.A. Europe Transmissions Societe Nouvelle Mecanique et Automobile, Saint Etienne, France

[21] Appl. No.: 548,008

[22] Filed: Nov. 2, 1983

[30] Foreign Application Priority Data

Nov. 3, 1982 [FR] France .............................. 82 18401

[51] Int. Cl.⁴ ...................... B60B 27/00; F16D 55/40
[52] U.S. Cl. .................................. 188/71.6; 188/18 A; 188/264 B; 188/264 D; 188/264 E; 192/113 B
[58] Field of Search ................. 188/264 R, 71.6, 71.5, 188/18 A, 264 D, 264 B, 264 P, 264 E, 264 A, 264 AA, 17, 18; 192/113 B, 113 R, 70.12; 301/6 CS, 6 CF, 6 WB, 105, 125; 180/70.1, 75, 88

[56] References Cited

U.S. PATENT DOCUMENTS

| 3,018,853 | 1/1962 | Thomas et al. | 188/264 D X |
| 3,202,253 | 8/1965 | Merritt et al. | 188/264 E X |
| 4,022,298 | 5/1977 | Malinowski | 188/71.6 |

FOREIGN PATENT DOCUMENTS

| 1106612 | 5/1961 | Fed. Rep. of Germany . |
| 2154474 | 5/1972 | Fed. Rep. of Germany . |
| 2392279 | 12/1978 | France . |
| 2517003 | 5/1983 | France . |
| 8002821 | 12/1980 | PCT Int'l Appl. . |
| 8103469 | 12/1981 | PCT Int'l Appl. . |
| 1594972 | 8/1981 | United Kingdom . |
| 2073115 | 10/1981 | United Kingdom . |

Primary Examiner—Douglas C. Butler
Attorney, Agent, or Firm—Charles E. Brown; Charles A. Brown

[57] ABSTRACT

A hub for a wheel having a built-in brake assembly and suitable for use in industrial vehicles, agricultural machinery, civil engineering plant and materials handling plant comprises a stub axle on which is rotatably mounted a hollow body forming a casing to contain a lubricating and cooling fluid. A brake assembly with fixed and rotatable disks is disposed within the hollow body inside an annulus constrained to rotate with the stub axle. Associated with the annulus is a scooping device adapted to provide communication between the interior of the annulus and the annular space between the annulus and the hollow body, for improved supply of the lubricating and cooling fluid to the interior of the annulus.

13 Claims, 7 Drawing Figures

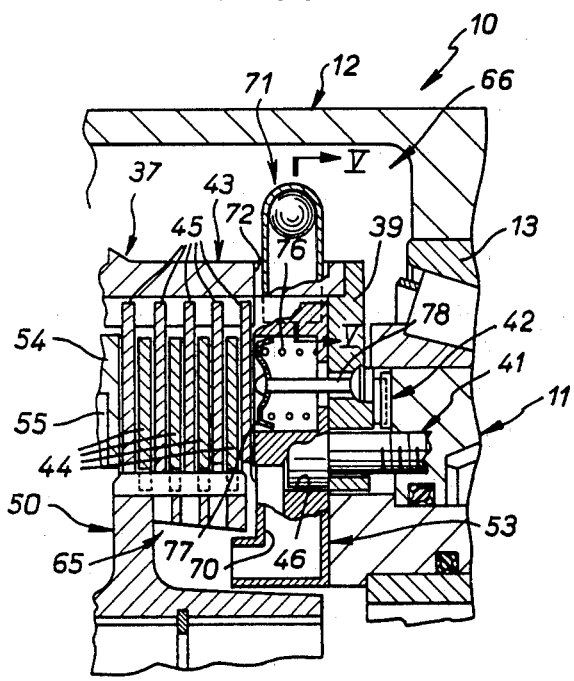

WHEEL HUB WITH BUILT-IN BRAKE

BACKGROUND OF THE INVENTION

1. Field of the Invention

The present invention is generally concerned with wheel hubs having a built-in brake assembly, of the kind used, for example, in fitting out industrial vehicles, agricultural machinery, civil engineering plant and materials handling plant such as cranes and travelling overhead cranes.

2. Description of the Prior Art

Generally speaking, a wheel hub of this kind comprises a hollow body rotatably mounted on a fixed support sleeve, commonly referred to as a stub axle, having an external transverse flange to which a wheel may be attached by means of its rim flange. Within the hollow body is a brake assembly comprising at least one rotary disk adapted to be constrained to rotate with the corresponding wheel shaft. In practice, there are a plurality of rotary disks of this kind alternating with fixed disks.

The present invention is more particularly directed to the case where this brake assembly is disposed within an annulus.

This is the case, in particular, when the hollow body contains, in addition to a brake assembly of this kind, a gear assembly adapted to reduce the service speed of the hollow body to an acceptable value.

In this case, the gear assembly usually comprises a plurality of planet wheels operative between a sun shaft constrained to rotate with the wheel shaft and an annulus constrained to rotate with the stub axle, and the space within this ring is used to install the associated brake assembly.

As a corollary to this, within the hollow body, which forms a casing adapted to contain a fluid, there is accommodated a certain quantity of oil to lubricate the component parts of the gear assembly. In addition to lubricating the component parts of the gear assembly, this oil also cools the disks of the associated brake assembly.

This oil is inevitably subjected in service to centrifugal forces which apply it to the internal wall of the hollow body as an annular layer.

The brake assembly, disposed within the annulus, is necessarily spaced from the hollow body and may as a result be inadequately lubricated, lubrication being effective only below a certain rotation speed of the assembly.

This problem is accentuated by the fact that, at present, communication between the volume internal to the annulus and the external annular volume between it and the hollow body is relatively difficult, being obtained through the disks of the brake assembly, which form a chicane, and possibly, when the annulus is constrained by splines to rotate with the annulus carrier through which it is constrained to rotate with the stub axle, through these splines.

A general object of the present invention is to improve the conditions under which the brake assembly is cooled.

SUMMARY OF THE INVENTION

The invention consists in a hub for a wheel, having a built-in brake assembly and comprising a fixed support sleeve, a hollow body which is mounted rotatably on said sleeve and constitutes a casing adapted to contain a fluid, an annulus which is disposed within said hollow body so as to leave an annular space between said annulus and said body and which is constrained to rotate with said sleeve, a brake assembly within said annulus featuring at least one rotary disk which is adapted to be constrained to rotate with an associated wheel shaft, and scooping means associated with said annulus which are adapted to provide communication between the interior of said annulus and said annular space between said annulus and said hollow body.

In a first embodiment which may be considered, these scooping means simply comprise at least one passage formed transversely in the annulus, in practice and for preference extending in a generally oblique direction relative to an axial plane of the assembly passing through its median part, and possibly cooperating with a tube which, inserted in a passage of this kind, projects externally of the annulus in the direction towards the hollow body.

In an alternative arrangement, the brake assembly comprises a transverse thrust plate within the annulus constrained, like the annulus, to rotate with the stub axle, the scooping means in accordance with the invention comprising, in a second embodiment of the invention which may be considered, at least one transverse passage formed in the thrust plate and a tube which, disposed in this passage from the side of the annulus, passes with clearance through the annulus by virtue of an opening in the annulus and projects externally of the annulus in the direction towards the hollow body.

Be this as it may, by virtue of the scooping means utilized in accordance with the invention, there is, systematically when in service, a forced feed of the cooling fluid into the interior of the annulus, this fluid being taken up by the scooping means in the annular external volume between the annulus and the hollow body, whereas, for reasons explained hereinabove, the lubricating fluid can return only with relative difficulty to the external volume under the effect of the centrifugal forces to which it is subjected.

Thus the brake assembly is effectively cooled irrespective of the operating conditions.

In accordance with a second feature of the invention, the wheel hub in accordance with the invention is preferably further characterized in that over at least part of its length said hollow body is circumferentially corrugated, whereby said annular space between said annulus and said hollow body forms radial cells.

In practice, these cells extend from the internal surface of the external flange provided on the hollow body for attaching a rim flange, and they alternate circumferentially with the passages which a flange of this kind usually comprises to accommodate the wheel bolts necessary for such attachment.

Apart from the fact that these cells offer the advantage of increasing the volume available for the cooling fluid without increasing the overall diameter of the assembly, they also increase the area of thermal exchange with the exterior, and thus offer improved fluid cooling conditions, further and advantageously causing agitation of the fluid.

Thus the brake assembly cooling conditions are advantageously improved.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 4 is a view in partial axial cross-section of an alternative embodiment of the wheel hub in accordance with the invention.

FIG. 5 is a partial view of this alternative embodiment in transverse cross-section on the line V—V in FIG. 4.

FIG. 6 shows again part of FIG. 2B and relates to a further embodiment of the wheel hub in accordance with the invention.

DESCRIPTION OF THE PREFERRED EMBODIMENT

Figure 1:
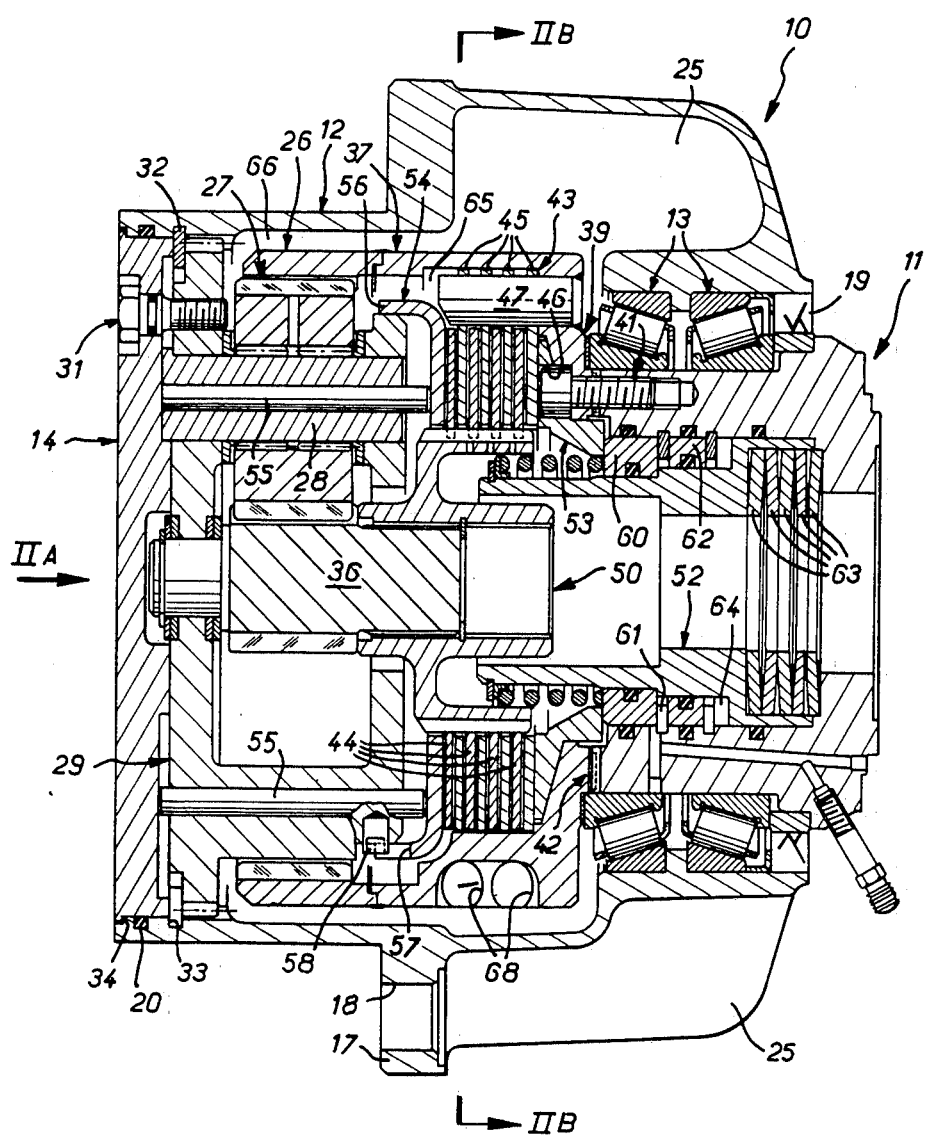
FIG. 1 is a view of the wheel hub in accordance with the invention in axial cross-section on the line I—I in FIG. 2B.

In a manner known per se and as shown in the figures, the wheel hub 10 in accordance with the invention, which is in practice a driving wheel hub, is designed to be mounted on a fixed support sleeve 11, commonly referred to as a stub axle, which is itself attached to the end of a rigid or steering axle and within which is rotatably mounted the corresponding wheel drive shaft.

The latter is not shown in the figures.

In a manner also known per se, the wheel hub 10 in accordance with the invention comprises a hollow body 12 which is generally tubular and rotatably mounted on the stub axle 11 through the intermediary of two bearings 13. In practice, in the embodiment shown, the hollow body 12 is closed on the side opposite the stub axle 11 by a transversely disposed and removable cover 14.

Externally, the hollow body 12 features a flange 17 to which the associated wheel may be attached by means of its rim flange, the flange 17 having to this end spaced passages 18 adapted to have pass through them the wheel bolts necessary for attaching the rim flange.

In practice, the hollow body 12 constitutes a casing adapted to contain a lubricating and cooling fluid.

To this end, a seal 19 is provided between it and the stub axle 11 and a seal 20 is similarly provided between it and the cover 14 which closes it.

Figures 2A, 2B, 3:
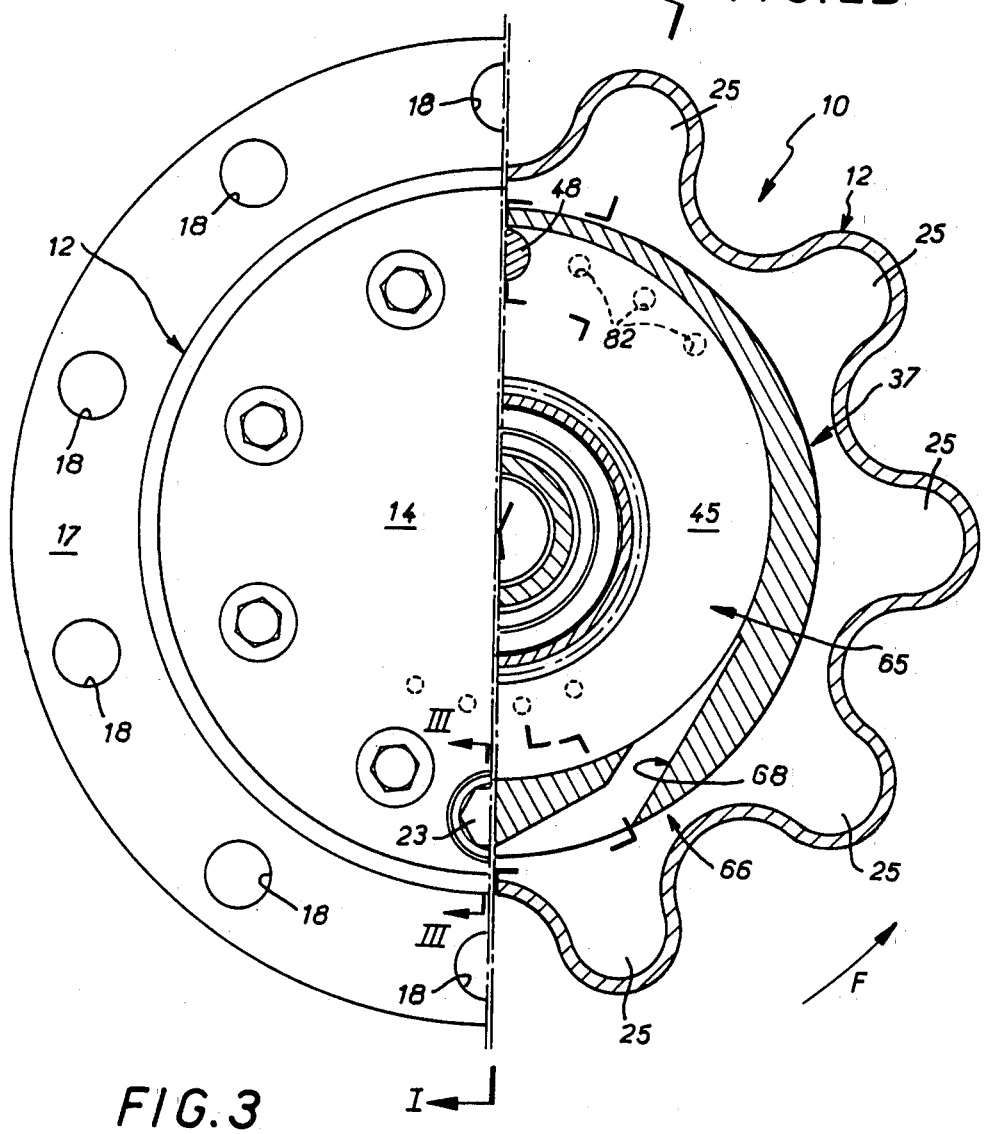
FIG. 2A is a half-view of it shown end-on in the direction of the arrow IIA in FIG. 1
FIG. 2B is a complementary half-view of it in axial cross-section on the line IIB—IIB in FIG. 1.
FIG. 3 is a partial view of the wheel hub in accordance with the invention in axial cross-section on the line III—III in FIG. 2A.

Conjointly, to permit the introduction of the necessary quantity of lubricating and cooling fluid, the cover 14 has an axial passage 22 which is normally closed off and sealed by a removable plug 23 (see FIGS. 2A and 3).

In the embodiment shown in FIGS. 1 to 3, and in accordance with one aspect of the invention, the hollow body 12 is circumferentially corrugated on the side of the flange 17 opposite the cover 14, that is to say on the same side of the flange 17 as the stub axle 11, and thereby forms radial cells 25.

In practice, and as shown, these cells 25 extend axially from the flange 17, on the internal surface of the latter, that is to say on the surface of the flange 17 directed towards the stub axle 11, and they alternate circumferentially with the passages 18 which the latter comprises.

Thus they can be made so as to extend in the radial direction as far as the immediate proximity of the external perimeter of the flange 17, without increasing the diameter of the assembly or interfering whth the passages 18 which the flange 17 features and so interfering with the passage through the flange 17 of the wheel bolts needed to attach the rim flange of the wheel concerned.

In the embodiment shown, ten passages 18 are formed in the flange 17 and there is an equal number of cells 25.

in the embodiment shown in FIGS. 1 to 3, a gear assembly 26 is disposed within the hollow body 12, on the side of the cover 14 which closes the latter.

In a manner which is known per se, the gear assembly 26 comprises a plurality of planet wheels 27 which are equi-angularly spaced around the axis of the assembly and which are rotatably mounted on respective pins 28 which are themselves supported by a planet carrier 29.

By virtue of arrangements which, not constituting part of the present invention, will not be described in detail here, the planet carrier 29 is constrained to rotate with the hollow body 12 and is coupled in the axial direction by screws 31 to the cover 14 closing the latter, bearing in the axial direction against a split elastic ring 32 disposed between it and the cover 14 in the axial direction and engaged in a groove 33 formed for this purpose on the internal surface of the hollow body 12. By means of a shoulder 34, the cover 14 itself bears in the axial direction on the corresponding edge of the latter.

In a manner known per se, the planet wheels 27 are operative between a shaft 36 adapted to be constrained to rotate with the associated wheel shaft and an annulus 37 which rotates with a transverse support flange 39, commonly referred to as the annulus carrier, which, through the latter, is constrained to rotate with the stub axle 11.

In the embodiment shown in FIGS. 1 to 3, the annulus carrier 39 is integral with the annulus 37 and is coupled to the stub axle 11 in the axial direction by equi-angularly spaced screws 41. Between it and the stub axle 11 direct-drive dog clutch means 42 are frontally operative.

As these arrangements do not as such constitute the object of the present application, they will not be described in further detail here.

Within the annulus 37 there is disposed a brake assembly 43.

In a manner known per se, a brake assembly 43 of this kind has at least one rotary disk 44 adapted to be constrained to rotate with the wheel shaft concerned.

In practice, a plurality of rotary disks 44 are provided, alternating with fixed disks 45, there being between these disks friction facings carried by the disks of one set or the other.

In the embodiment shown in FIGS. 1 to 3, the fixed or external disks 45 are axially engaged upon a single support peg 47 which is common to them and which is axially supported on the annulus carrier 39, extending in the direction towards the cover 14.

Conjointly, the rotary or internal disks 44 are constrained, by means of a splined coupling, to rotate with a support hub 50 which is engaged with the shaft 36 by a further splined coupling and is adapted, in the embodiment shown, to provide a rotational coupling between the shaft 36 and the associated wheel shaft through engagement with the latter, by means of splines, for example.

The support peg 47 for the fixed disks 45 is naturally outside the external perimeter of the rotary disks 44.

Furthermore, in the embodiment shown, and by virture of arrangements of the kind disclosed in French patent application No. 81 21885 filed Nov. 23, 1981 which is French publication No. 2,517,003. The internal wall of the annulus 37 is eccentric relative to the axis of the assembly where it is in line with the fixed disks 45, and the outer perimeter of these fixed disks 45 may itself be eccentric relative to this axis in order to secure cooperation with the internal wall of the annulus 37.

Under the control of a control unit 52, the rotary disks 44 and the fixed disks 45 are conjointly adapted to be axially clamped between, on the one hand, a thrust plate 53 which is disposed within the annulus 37 and acted on by the control unit 52 and, on the other hand, a bearing plate 54 which is itself in axial bearing engagement with the cover 14 closing the hollow body 12, through the intermediary of pegs 55 which pass axially through the planet carrier 29.

The thrust plate 53 is contiguous with the annulus carrier 39 and, by means of passages 46, engaged on the head of screws 41 axially coupling the latter to the stub axle 11, so that it is constrained to rotate with the latter.

In the embodiment shown, the bearing plate 51 is keyed to rotate with the hollow body 12, having at its perimeter an axial lip 56 by means of which it is engaged and centered on the planet carrier 29, this axial lip 56 itself featuring at least one notch 57 by means of which it is engaged with a radial pin 58 projecting to this end from the planet carrier 29.

As the control unit 52 does not form part of the present invention, it will not be described in greater detail here.

It is sufficient to indicate that, in the embodiment shown, it comprises, on the one hand, a service piston 60 and cylinder 61, the latter adapted to be connected to a source of fluid under pressure and the former bearing on the thrust plate 53 and, on the other hand, a standby or parking piston 62 which is acted on by a stack of Belleville washers 63 and adapted to act on the service piston 60 and, through this piston, on the thrust plate 53, in order to retain it, its cylinder 64 being normally connected to a source of fluid under pressure distinct from the aforementioned source.

In accordance with the invention, there are associated with the annulus 37, within the internal volume 65 of which are disposed the rotary disks 44 and fixed disks 45 of the brake assembly 43, scooping means adapted to provide communication between the internal volume 65 and the annular external volume 66 between the annulus 37 and the hollow body 12.

In the embodiment shown in FIGS. 1 to 3, the scooping means comprise at least one passage 68 formed transversely in the annulus 37, in line with the disks 44, 45 of the brake assembly 43.

In practice, in this embodiment, the annulus 37 has at least one transverse passage 68 in each of at least two different transverse planes which are staggered in the axial direction (see FIG. 1).

These passages extend generally obliquely relative to the axial plane of the assembly passing through their median part.

A plurality of passages 68 may naturally be provided in each of the transverse planes concerned of the annulus 37, being for example and for preference equi-angularly spaced around the axis of the assembly.

The inclination of these oblique passages 68 is determined in accordance with the normal direction of rotation of the hollow body 12, corresponding to forward movement of the vehicle concerned and indicated by an arrow F in FIG. 2B.

Relative to this normal direction of rotation, the outlet from a passage 68 into the volume 66 external of the annulus 37 is on the upstream side of its outlet into the volume 65 internal to this annulus 37.

However, analogous passages may be provided for the opposite direction of rotation of the hollow body 12, if required, corresponding to rearward movement of the vehicle concerned.

In such a case, the annulus 37 comprises, in accordance with the invention, at least one transverse passage 68 oblique in one sense and at least one passage 68 oblique in the opposite sense (not shown in the figures).

Be this as it may, when in service, the lubricating and cooling fluid in the casing formed by the hollow body 12, which tends to accumulate as an annular layer on the internal surface of the latter by virture of centrifugal force, can, with advantage, be directed by means of the passages 68 constituting the scooping means in accordance with the invention into the internal volume 65 of the annulus 37, to provide the required cooling of the disks 44, 45 of the brake assembly 43 therein.

Through these disks, which constitute a chicane, and through the splines between the planet wheels 28 of the gear assembly 27 and the annulus 37, the fluid returns to the volume 66 external to the latter.

In the case where, as previously mentioned, one or more passages 68 are provided in the opposite direction, it is through this passage or these passages that at least part of the lubricating and cooling fluid returns to the volume 66 external to the annulus 37.

As will be noted, in the embodiment shown in FIGS. 1 to 3, the cells 25 formed in accordance with the invention by the hollow body 12 constitute part of the volume 66 external to the annulus 37, so that the capacity of the latter is with advantage increased.

In the embodiment shown in FIGS. 1 to 3, over at least part of its length at least one of the transverse passages 68 in the annulus 37, and in practice each of these passages, is externally flared in the direction towards its outlet into the volume 66 external to the annulus 37 (FIG. 2B) so that there results progressive acceleration of the fluid taken from the aforementioned external volume before it enters the internal volume 65 of the annulus 37.

In the alternative embodiment shown in FIGS. 4 and 5, the scooping means in accordance with the invention comprise at least one transverse passage 70 formed in the thrust plate 53 and a tube 71 inserted into the passage 70 from the side of the annulus 37 and which passes with at least axial clearance through the annulus 37 by virtue of an opening 72 provided for this purpose in it, the tube 71 projecting externally of the annulus 37 in the direction towards the hollow body 12.

For preference, and as shown, the passage 70 extending transversely through the thrust plate 53 for this purpose discharges axially into the internal volume 65 of the annulus 37 in the proximity of the internal perimeter of this thrust plate 53 and thus, with advantage, internally of disks 44, 45 of the brake assembly 43.

In practice, a passage 70 of this kind extending in a generally radial direction, the tube 71 is T-shaped comprising two inlets 74A, 74B disposed in opposite circumferential directions.

For preference, and as shown, a non-return valve 75 is provided between these inlets 74A, 74B of the tube 71 so that only one of them is effectively operative, according to the direction of rotation of the hollow body 12.

A plurality of passages 70 may naturally be formed in the thrust plate 53, each with a tube 71.

Be this as it may, a passage 70 of this kind is obviously disposed, in the circumferential direction, between the screws 41 which attach the annulus carrier 39 to the stub axle 11 in the axial direction.

In the case where, as shown, there are provided axial springs each bearing individually on a cup 77 coupled by a rod 78 to the annulus carrier 39, and acting on the thrust plate 53 so as to continuously urge it away from the disks 44, 45 of the brake assembly 43, so as to avoid unwanted residual axial clamping of the latter between two braking operations, the passages 70 which this thrust plate 53 comprises are formed between the springs 76.

Thus in this case there is circumferential alternation of the screws 41, the passages 70 and the springs 76.

Furthermore, it will be noted that in the embodiment shown in FIGS. 4 to 5 the fixed disks 45 of the brake assembly 43 are constrained to rotate with the annulus 37 by means of a splined coupling provided for this purpose between them and annulus 37.

In the further embodiment of FIG. 6, which is of the same general kind as the embodiment previously described with reference to FIGS. 1 to 3, in at least one of the passages 68 in the annulus 37, and in practice in each of the latter, there is engaged a tube 80 which projects externally of the annulus 37 in the direction towards the hollow body 12.

This may simply consist, as shown, of a longitudinally split bush which is thus elastically deformable in the radial direction and force-fitted into the passage 68.

Be this as it may, a tube 80 of this kind offers the advantage of taking up the lubricating and cooling fluid as close as possible to the hollow body 12, especially in the case where, as shown, the hollow body 12 does not form cells.

It will be understood that various changes in the details, materials and arrangements of parts, which have been herein described and illustrated in order to explain the nature of the invention, may be made by those skilled in the art within the principle and scope of the invention as expressed in the appended claims.

For example, as shown in dashed line in FIG. 2B passages 82 may be provided, if required, in the fixed disks 45 of the brake assembly 43 in the vicinity of their support peg 47, to prevent undesirable cavitation of the lubricating and cooling fluid in the internal volume 65 of the annulus 37 and to facilitate its axial return movement into the volume 66 external to the annulus 37.

I claim:

1. A hub for a wheel, said hub having a built-in brake assembly and comprising a fixed support sleeve, a hollow body which is mounted rotatably on said sleeve and constitutes a casing adapted to contain a hydraulic lubrication and cooling fluid, an annulus disposed within said hollow body so as to leave an annular space between said annulus and said body, said brake assembly being within said annulus and featuring at least one rotary disk which is adapted to be constrained to rotate with an associated wheel shaft, and scooping means associated with said annulus for force feeding the hydraulic fluid radially inwardly from said annular space between said annulus and said hollow body into the interior of said annulus in order to cool and lubricate the brake disk therein.

2. A wheel hub according to claim 1, wherein said scooping means comprise at least one transverse passage in said annulus.

3. A wheel hub according to claim 2, wherein said passage extends in a generally oblique direction.

4. A wheel hub according to claim 3, wherein said annulus comprises at least one transverse passage which is disposed obliquely in a first direction and at least one transverse passage which is disposed obliquely in the opposite direction.

5. A wheel hub according to claim 2, wherein over at least part of its length at least one of said transverse passage in said annulus is outwardly flared in the direction towards its opening into said annular space between said annulus and said hollow body.

6. A wheel hub according to claim 2, wherein said annulus comprises at least one transverse passage in each of at least two different transverse planes.

7. A wheel hub according to claim 2, further comprising a tube which is disposed within at least one of said transverse passage in said annulus and which projects externally of said annulus in the direction towards said hollow body.

8. A wheel hub according to claim 1, wherein said brake assembly comprises, within said annulus, a thrust plate which is constrained to rotate with said sleeve and said scooping means comprise at least one transverse passage in said thrust plate and a tube which is disposed within said passage from the side of said annulus and passes with clearance through said annulus by virtue of an opening in said annulus and projects externally of said annulus in the direction towards said hollow body.

9. A wheel hub according to claim 8, wherein said transverse passage in said thrust plate discharges into the interior of said annulus in the close proximity of the internal perimeter of said thrust plate.

10. A wheel hub according to claim 8, wherein said tube of said scooping means is T-shaped and said passage in which it is disposed extends in a generally radial direction, said tube having two inlets extending in opposite circumferential directions.

11. A wheel hub according to claim 10, further comprising a non-return valve disposed between said two inlets of said tube.

12. A wheel hub according to claim 1, wherein over at least part of its length said hollow body is circumferentially corrugated, whereby said annular space between said annulus and said hollow body forms radial cells.

13. A wheel hub according to claim 1, wherein said hollow body has a circumferentially corrugated wall over at least part of its circumferential extent, said annular space between said annulus and said hollow body thus also being corrugated with inwardly opening radial cells.

* * * * *